US009951829B2

United States Patent
Shibata et al.

(10) Patent No.: US 9,951,829 B2
(45) Date of Patent: Apr. 24, 2018

(54) CONTROL SYSTEM FOR VEHICLE

(71) Applicant: TOYOTA JIDOSHA KABUSHIKI KAISHA, Aichi-ken (JP)

(72) Inventors: Hiroyuki Shibata, Odawara (JP); Hiroyuki Shioiri, Yokohama (JP); Hideaki Komada, Gotemba (JP); Yuki Kurosaki, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 42 days.

(21) Appl. No.: 15/128,215

(22) PCT Filed: Mar. 26, 2015

(86) PCT No.: PCT/IB2015/000399
§ 371 (c)(1),
(2) Date: Sep. 22, 2016

(87) PCT Pub. No.: WO2015/145246
PCT Pub. Date: Oct. 1, 2015

(65) Prior Publication Data
US 2017/0097055 A1    Apr. 6, 2017

(30) Foreign Application Priority Data

Mar. 28, 2014 (JP) .................. 2014-067786

(51) Int. Cl.
*B60L 9/00* (2006.01)
*B60L 11/00* (2006.01)
(Continued)

(52) U.S. Cl.
CPC .............. *F16D 48/06* (2013.01); *B60K 6/365* (2013.01); *B60K 6/387* (2013.01); *B60K 6/442* (2013.01);
(Continued)

(58) Field of Classification Search
CPC ........ B60K 6/365; B60K 6/387; B60K 6/442; B60K 6/445; B60L 11/14; B60L 15/2054; B60W 20/20; B60W 20/30
(Continued)

(56) References Cited

U.S. PATENT DOCUMENTS

2008/0223681 A1  9/2008  Stevenson et al.
2009/0084653 A1  4/2009  Holmes
(Continued)

FOREIGN PATENT DOCUMENTS

FR      2947882 A1    1/2011
JP      5170301 B2    3/2013
JP      2013-216219 A  10/2013

*Primary Examiner* — Maceeh Anwari
(74) *Attorney, Agent, or Firm* — Sughrue Mion, PLLC

(57) ABSTRACT

A selectable one-way clutch includes an engagement mechanism. The engagement mechanism is configured to be switched between an engaged state and a disengaged state. The engaged state is a state in which relative rotation between a first and a second members in one of a positive rotational direction and a reverse rotational direction is restricted. The disengaged state is a state in which the relative rotation between the first member and the second member in both of the positive and the reverse rotational direction is permitted. The electronic control unit is configured to apply torque to the one of the first member or the second member by using a motor such that relative rotation in the other one of the positive or the reverse rotational direction is generated between the first member and the second member when the engagement mechanism is switched from the engaged state to the disengaged state.

10 Claims, 10 Drawing Sheets

(51) Int. Cl.

| | |
|---|---|
| G05D 1/00 | (2006.01) |
| G05D 3/00 | (2006.01) |
| G06F 7/00 | (2006.01) |
| G06F 17/00 | (2006.01) |
| F16D 48/06 | (2006.01) |
| B60K 6/365 | (2007.10) |
| B60K 6/387 | (2007.10) |
| B60K 6/442 | (2007.10) |
| B60K 6/445 | (2007.10) |
| B60L 11/14 | (2006.01) |
| B60L 15/20 | (2006.01) |
| B60W 20/20 | (2016.01) |
| B60W 20/30 | (2016.01) |

(52) U.S. Cl.
CPC .............. *B60K 6/445* (2013.01); *B60L 11/14* (2013.01); *B60L 15/2054* (2013.01); *B60W 20/20* (2013.01); *B60W 20/30* (2013.01); *B60L 2240/423* (2013.01); *B60L 2240/441* (2013.01); *B60L 2240/507* (2013.01); *B60W 2710/021* (2013.01); *B60W 2710/083* (2013.01); *B60Y 2400/427* (2013.01); *B60Y 2400/80* (2013.01); *F16D 2500/10462* (2013.01); *F16D 2500/10493* (2013.01); *F16D 2500/3026* (2013.01); *F16D 2500/30406* (2013.01); *F16D 2500/30415* (2013.01); *F16D 2500/30426* (2013.01); *F16D 2500/50615* (2013.01); *F16D 2500/525* (2013.01); *F16D 2500/70408* (2013.01); *F16D 2500/70424* (2013.01); *F16D 2500/70426* (2013.01); *F16D 2500/70436* (2013.01); *F16D 2500/70442* (2013.01); *Y02T 10/7258* (2013.01); *Y10S 903/911* (2013.01); *Y10S 903/914* (2013.01); *Y10S 903/915* (2013.01)

(58) Field of Classification Search
USPC .......................................................... 701/22
See application file for complete search history.

(56) References Cited

U.S. PATENT DOCUMENTS

| | | |
|---|---|---|
| 2010/0252384 A1 | 10/2010 | Eisengruber |
| 2011/0320084 A1 | 12/2011 | Muta et al. |

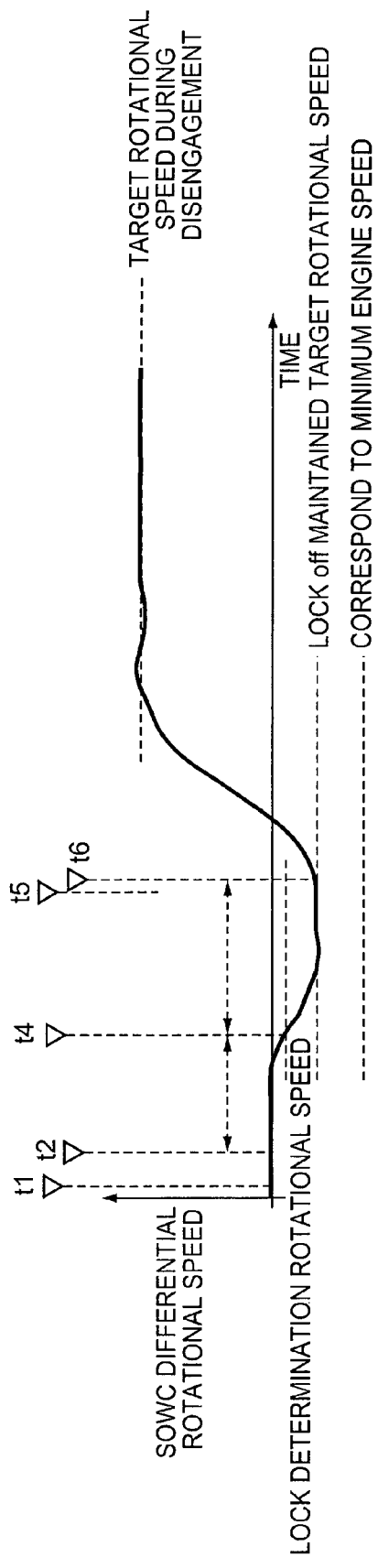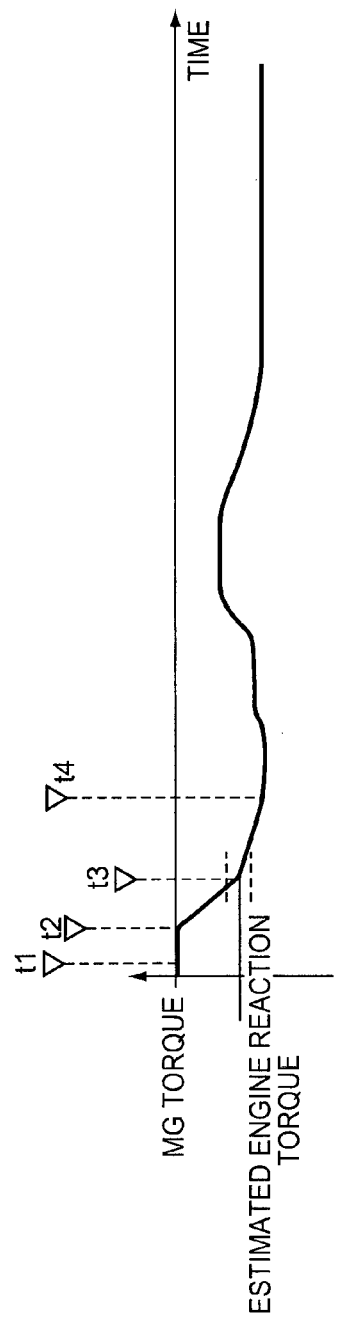

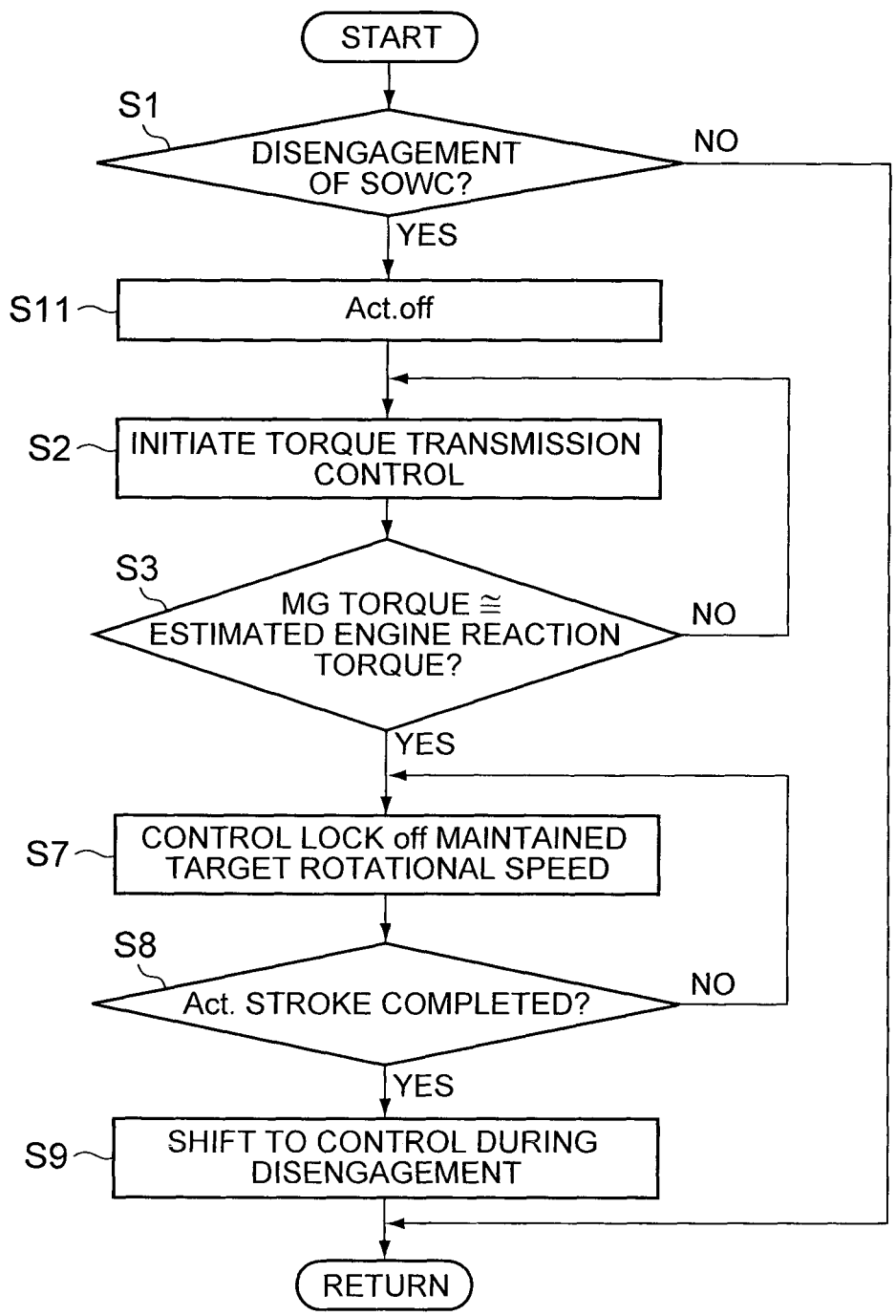

CONTROL SYSTEM FOR VEHICLE

BACKGROUND OF THE INVENTION

1. Field of the Invention

The invention relates to a control system that controls a, mechanism that transmits power for a travel of a vehicle. Particularly, the invention relates to a control system for a vehicle that includes, a selectable one-way clutch.

2. Description of Related Art

A vehicular transmission that includes a selectable one-way clutch (hereinafter described as an SOWC) is described in US 2009/0084653 A. The SOWC has paired rings that are arranged to face each other. One of the rings is provided with a strut that is projected toward the other ring. The other ring is provided with a pocket which a tip of the strut enters and is engaged with. The strut is housed in a through opening provided in the one ring. The strut is configured to be pressed and projected toward the pocket side by a projecting tooth via a spring, the projecting tooth being inserted in the through opening from a back surface side of the one ring (an opposite side of a surface that faces the other ring). In addition, a selector plate is arranged between the rings in a manner to rotate by a specified angle, the selector plate including a window through which the strut is inserted.

The selector plate rotates in a state that an elastic force of the spring presses the strut to the other ring side. Accordingly, the window of the selector plate corresponds to the through opening (that is, the strut) in a rotational direction thereof. In this way, the strut is projected to the other ring side and engaged with the pocket that is formed in the other ring. Meanwhile, the selector plate is rotated by a frictional force that is generated when contacting a front surface of the other ring. In addition, the projecting tooth is retracted in a state that the strut is engaged with the pocket. Accordingly, the strut is, no longer pressed to the pocket side. However, due to a frictional force between the strut and the pocket, an engaged state of the strut with the pocket is maintained. The retraction of the projecting tooth causes reduction of a load that presses the selector plate against the other ring. Here, the spring for rotating the selector plate is arranged between the one ring and the selector plate. Thus, when the projecting tooth is retracted, the selector plate is rotated by the elastic force, and the window is displaced from a position of the strut. In other words, the strut is pressed in the through opening by the selector plate and is thus separated from the pocket. As a result, the SOWC is switched to a disengaged state.

SUMMARY OF THE INVENTION

The SOWC described in US 2009/0084653 A is a so-called dog clutch. The frictional force acts between the strut and the pocket in a state that the strut is engaged with the pocket, and thus movement of the strut is restricted. Accordingly, when the SOWC is switched from an engaged state to the disengaged state, the retraction of the projecting tooth is not enough to remove the strut from the pocket, and the engaged state of the strut with the pocket continues. Later on, a force of the selector plate to press the strut into the through opening overcomes the frictional force between the strut and the pocket. Thus, the strut is removed and then disengaged from the pocket.

The frictional force between the strut and the pocket and the force of the selector plate to press the strut to the through opening side in this case are determined by various factors, such as torque that acts between the rings; a friction coefficient between the strut and the pocket, and the frictional force between the selector plate and the front surface of the other ring, and thus are not necessarily constant. In addition, a device described in US 2009/0084653 A is not configured to actively control these types of the force, the frictional force, and the like.

As described above, in the device described in US 2009/0084653 A, in the case where the SOWC is switched from the engaged state to the disengaged state, switching to the disengaged state, is delayed. It is because the strut is not immediately removed from the pocket even when the projecting tooth is retracted. In addition, it is impossible to accurately detect or recognize timing at which the strut is removed from the pocket and the SOWC is substantially brought into the disengaged state. For this reason, a long delayed time period (or a long wait time period) is necessary from the disengagement of the SOWC to initiation of next control. In other words, if the next control that follows the disengagement of the SOWC is initiated sooner, there is a possibility that the next control is initiated before the SOWC is switched to the disengaged state. Accordingly, an excessive load may be generated in a specified gear, shaft, or the like, or a shock may occur.

The invention provides a control system for a vehicle that can disengage a selectable one-way clutch without producing any particular delay.

A first aspect of the invention is a control system for a vehicle. The control system includes a selectable one-way clutch, a motor, and an electronic control unit. The selectable one-way clutch includes an engagement mechanism. The engagement mechanism includes a first member and a second member. The second member is configured to rotate relative to the first member. The engagement mechanism is configured to switch between an engaged state and a disengaged state. The engaged state is a state in which relative rotation between the first member and the second member in one of a positive rotational direction and a reverse rotational direction is restricted. The disengaged state is a state in which (i) the relative rotation between the first member and the second member in the one of a positive rotational direction and a reverse rotational direction and (ii) relative rotation between the first member and the second member in the other one of the positive rotational direction and the reverse rotational direction are permitted. The motor is configured to rotate one of the first and second members. The electronic control unit is configured to apply torque to the one of the first member and the second member by using the motor such that the rotation relative in the one of the positive rotational direction and the reverse rotational direction is generated between the first member and the second member when the engagement mechanism is switched from the engaged state to the disengaged state.

In the above aspect, the electronic control unit may be configured to switch the engagement mechanism from the engaged state to the disengaged state in a state that the relative rotation in the other one of the positive rotational direction and the reverse rotational direction is generated.

In the above aspect, the electronic control unit may be configured to maintain a difference in rotational speed between the first member and the second member at a predetermined target value in a state that the relative rotation in the other one of the positive rotational direction and the reverse rotational direction is generated.

In the above aspect, the electronic control unit may be configured to continue maintaining the difference in rotational speed at the target value until the engagement mechanism is switched from the engaged state to the disengaged state.

In the above aspect, the electronic control unit may be configured to switch the engagement mechanism to the disengaged state when a rotational speed of the relative rotation in the other one of the positive rotational direction and the reverse rotational direction reaches a predetermined reference rotational speed.

In the above aspect, the engagement mechanism may include an engagement piece, an actuator, and a sensor. The engagement piece may be supported by one of the first member and the second member. The other one of the first member and the second member may have a recessed section. The recessed section may be configured to fit a tip of the engagement piece and the recessed section is engaged with the engagement piece. The actuator may be configured to operate the engagement piece to an engaged position and a disengaged position. The engaged position may be a position at which the tip of the engagement piece is moved toward the other one of the first member and the second member by the actuator and the tip of the engagement piece is engaged with the recessed section. The disengaged position may be a position at which the tip of the engagement piece is separated from the recessed section by the actuator. The sensor may be configured to detect an operation amount of the actuator. The electronic control unit may be configured to determine that the engagement mechanism is switched to the disengaged state based on the operation amount of the actuator that is detected by the sensor.

In the above aspect, the control system may further include an internal combustion engine, an output member, and a power transmission mechanism. The power transmission mechanism may include a fixed section and a first differential mechanism. The fixed section may be coupled to the other one of the first member and the second member. The fixed section may be configured not to rotate and move. The first differential mechanism may include a first rotary element, a second rotary element, and a third rotary element, each of which performs a differential action with respect to each other. The internal combustion engine may be coupled to the first rotary element. The motor and the other one of the first member and the second member may be coupled to the second rotary element. The first differential mechanism may be configured such that torque is configured to output from the third rotary element to the output member. The first differential mechanism may be configured such that a speed of the internal combustion engine may be reduced when a rotational speed of the second rotary element that is in the same direction as a rotational direction of the internal combustion engine is reduced or when a rotational speed of the second rotary element that is in an opposite direction from the rotational direction of the internal combustion engine is increased.

In the above aspect, the control system may further include an internal combustion engine, an output member, and a power transmission mechanism. The power transmission mechanism may include a fixed section, a first differential mechanism, and a second differential mechanism. The fixed section may be coupled to the other one of the first member and the second member. The fixed section may be configured not to rotate and move. The first differential mechanism may include a first rotary element, a second rotary element, and a third rotary element, each of which performs a differential action with respect to each other. The internal combustion engine may be coupled to the first rotary element. The motor may be coupled to the second rotary element. The first differential mechanism may be configured such that the torque is output from the third rotary element to the output member. The second differential mechanism may include a fourth rotary element, a fifth rotary element, and a sixth rotary element, each of which performs a differential action with respect to each other. The first rotary element may be coupled to the fourth rotary element. The second rotary element may be coupled to the fifth rotary element. The one of the first member and the second member may be coupled to the sixth rotary element. The fifth rotary element may be configured to rotate in an opposite direction from a rotational direction of the fourth rotary element when the rotation of the sixth rotary element stops. The first differential mechanism and the second differential mechanism may be configured such that a speed of the internal combustion engine is reduced when a rotational speed of the second rotary element that is in the same direction as the rotational direction of the internal combustion engine is reduced or when the rotational speed of the second rotary element that is in the opposite direction from the rotational direction of the internal combustion engine is increased.

In the above aspect, the rotational speed of the relative rotation in the other one of the positive rotational direction and the reverse rotational direction may correspond to a rotational speed of the motor that rotates the second rotary element in the opposite direction. The rotational speed of the relative rotation in the other one of the positive rotational direction and the reverse rotational direction may correspond to a rotational speed that is at least equal to a minimum rotational speed at which the internal combustion engine rotates independently.

In the above aspect, the control system may further include an internal combustion engine. The other one of the first member and the second member may be configured such that torque of the internal combustion engine, acts on the other one of the first member and the second member. The target value may be a value at which an absolute value of the rotational speed of the relative rotation in the other one of the positive rotational direction and the reverse rotational direction is maintained to be larger than "0" even when the torque of the internal combustion engine fluctuates in a process of switching the engagement mechanism from the engaged state to the disengaged state.

In the above aspect, the electronic control unit may be configured to switch the engagement mechanism from the engaged state to the disengaged state by generating the relative rotation in the other one of the positive rotational direction and the reverse rotational direction in a state that control to switch the engagement mechanism from the engaged state to the disengaged state is executed.

According to the above aspect, when torque acts between the first member and the second member in a direction to restrict the relative rotation, a load is applied to the engagement mechanism in the engaged state. However, when the engagement mechanism is switched from the engaged state to the disengaged state, the relative rotation that is in the opposite direction from the restricted direction is generated between the first member and the second member. Accordingly, the load that is applied to the engagement mechanism is canceled. The relative rotation for disengaging the engagement mechanism as described above is generated by the motor, and thus the load can reliably be canceled. The disengaging operation of the engagement mechanism is performed in a state that the load is canceled as described above. Thus, the engagement mechanism can reliably and rapidly be switched to the disengaged state.

Especially when the control to switch to the disengaged state is executed in a state that the relative rotation in the other one of the positive rotational direction and the reverse rotational direction (a negative differential rotation) is generated, control for switching the engagement mechanism to the disengaged state is initiated in a state that the above load acts on the engagement mechanism. Thus, the engagement mechanism is switched to the disengaged state substantially at the same time as the initiation of the control, and thus the engagement mechanism can reliably and rapidly be switched to the disengaged state.

In the case where it is configured that the rotational speed of the negative differential rotation is maintained at the target value, a state of the negative differential rotation is maintained even when the torque in the restricted rotational direction acts between the first member and the second member due to some disturbance factor. Accordingly, even a temporal inhibition of the disengaging operation of the engagement mechanism is avoided. As a result, the engagement mechanism can reliably and rapidly be switched to the disengaged state.

Especially when the rotational speed of the negative differential rotation is maintained at the target value until the engagement mechanism is switched to the disengaged state, the engagement mechanism can reliably and rapidly be switched to the disengaged state.

According to the above aspect, the engagement mechanism is switched to the disengaged state due to the generation of the negative differential rotation. For this reason, the rotational speed of the relative rotation between the first member and the second member in the other one of the positive rotational direction and the reverse rotational direction reaches a specified reference rotational speed. Thus, the control for switching the engagement mechanism to the disengaged state is executed. As a result, the engagement mechanism can reliably be switched from the engaged state to the disengaged state.

According to the above aspect, when it is configured that the engagement piece is operated by a specified actuator, it is possible to detect or determine that the engagement mechanism has been switched from the engaged state to the disengaged state on the basis of an operation amount of the actuator, the engagement piece constituting the engagement mechanism.

The above aspect can be applied to a control device for the power transmission mechanism in which the speed of the internal combustion engine can be controlled by the motor via the differential mechanism. In this case, the engagement mechanism can restrict rotation of any of the rotary elements of the differential mechanism in a specified direction. Then, the engagement mechanism can reliably and rapidly be switched from the engaged state to the disengaged state.

In this case, the rotational speed of the negative differential rotation is set to the rotational speed at which the internal combustion engine can rotate independently. Thus, stalling of the internal combustion engine can be avoided or suppressed.

According to the above aspect, in the case where it is configured that the torque of the internal combustion engine acts on the engagement mechanism, the rotational speed of the negative differential rotation is maintained at the rotational speed that is higher than "0". Accordingly, such a situation where the load is applied to the engagement mechanism even with fluctuation in torque of the internal combustion engine or where the disengaging operation is inhibited in conjunction with the application of the load does not occur. Thus, the engagement mechanism can reliably be switched to the disengaged state.

According to the above aspect, it can be configured that the negative differential rotation is generated in a state that the control for disengaging the engagement mechanism is initiated. Even in this case, due to the generation of the negative differential rotation, the engagement mechanism can reliably be switched to the disengaged state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 includes collinear diagrams on a planetary gear mechanism that constitutes a power split mechanism of;

FIG. 8A includes time charts that respectively show an example of a change in a rotational speed of negative differential rotation when the control in FIG. 7 is executed;

FIG. 8B includes time charts that respectively show an example of a change in torque of a first motor when the control in FIG. 7 is executed;

FIG. 9 is a flowchart for illustrating another example of control that is executed by the control device according to the invention;

DETAILED DESCRIPTION OF EMBODIMENTS

Figure 1:
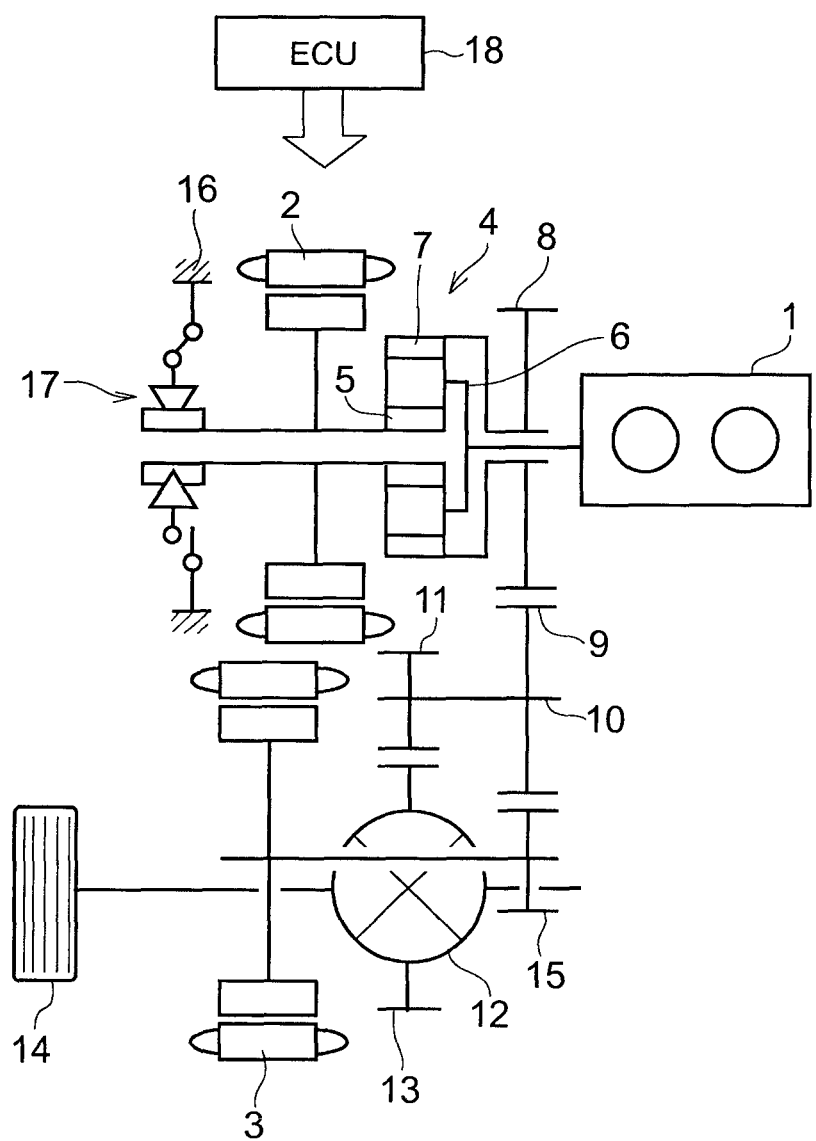
FIG. 1 is a skeleton diagram of an example of a power transmission mechanism that can be a subject of the invention.

The invention can be applied to a control device of which a power transmission mechanism in a hybrid vehicle is a subject. First, an example of the power transmission mechanism will be described. FIG. 1 schematically shows the power transmission mechanism in the hybrid vehicle of two-motor of the multiple shaft-type. The power transmission mechanism includes: an engine (Eng) 1 that, as a drive power source, is an example of an internal combustion engine of the invention; a first motor (MG1) 2 that is an example of a motor of the invention and has an electrical power generating function; and a second motor (MG2) 3 that has an electrical power generating function. The first motor 2 mainly executes control of a speed of the engine. 1 and cranking of the engine 1. Together with the engine 1, the first motor 2 is coupled to a power split mechanism 4 that is an example of a first differential mechanism of the invention.

In the example shown in FIG. 1, the power split mechanism 4 is constructed of a planetary gear mechanism of single pinion type that includes a sun gear 5, a carrier 6, and a ring gear 7 as rotary elements. A rotor of the first motor 2 is coupled to the sun gear 5 that is an example of a second rotary element of the invention. An output shaft (a crankshaft) of the engine 1 is coupled to the carrier 6 that is an example of a first rotary element of the invention. The ring gear 7 that is an example of a third rotary element of the invention is an output element. An output gear 8 as an output member is attached to the ring gear 7. The output gear 8 meshes with a counter driven gear 9. The counter driven gear 9 is attached to a counter shaft 10. A counter drive gear 11 that has a smaller diameter than the counter driven gear 9 is attached to the counter shaft 10. The counter drive gear 11 meshes with a ring gear 13 in a differential 12. This differential 12 outputs drive torque to right and left drive wheels 14.

The second motor 3 mainly functions as a drive power source for a travel. A drive gear 15 that is attached to a rotor shaft of the second motor 3 meshes with the counter driven gear 9. This drive gear 15 has a smaller diameter than the counter driven gear 9. Thus, the drive gear 15 and the counter driven gear 9 constitute a speed reduction mechanism.

A selectable one-way clutch (hereinafter described as an SOWC) 17 is provided between the sun gear 5, to which the first motor 2 is coupled, and a casing 16 that is an example of a fixed section of the invention. This SOWC 17 is a clutch that is configured to enable relative rotation in either a positive direction or a negative direction and, to prevent torque transmission in a disengaged state. This SOWC 17 is also a clutch that is configured to restrict (or inhibit) relative rotation in one of the positive direction and, the negative direction to transmit torque in a direction of the relative rotation and enable relative rotation in an opposite direction to the direction of the relative rotation to prevent the torque transmission in an engaged state. Here; positive rotation refers to rotation in the same direction as a rotational direction of the engine 1. Reverse rotation (or negative rotation) refers to rotation in an opposite direction from the rotational direction of the engine 1. Noted that the specific configuration of the SOWC 17 will be described below.

The first motor 2 and the second motor 3 are connected to an unillustrated controller unit such as an electrical storage device and an inverter and are electrically connected to each other to enable electrical power transfer therebetween. In addition, an electronic control unit (ECU) 18 is provided to control these electrical storage device and controller unit, the SOWC 17, or the like. This electronic control unit 18 is constructed of a microcomputer as a main body. This electronic control unit 18 is configured to receive detection signals indicative of a vehicle speed, an accelerator operation amount, an engine speed, estimated output torque, a rotational speed and torque of each of the motors 2, 3, an operating state of the SOWC 17, and the like as data, to perform computation based on the data, and to output command signals for controlling each of the motors 2, 3 and the SOWC 17.

Figure 2:
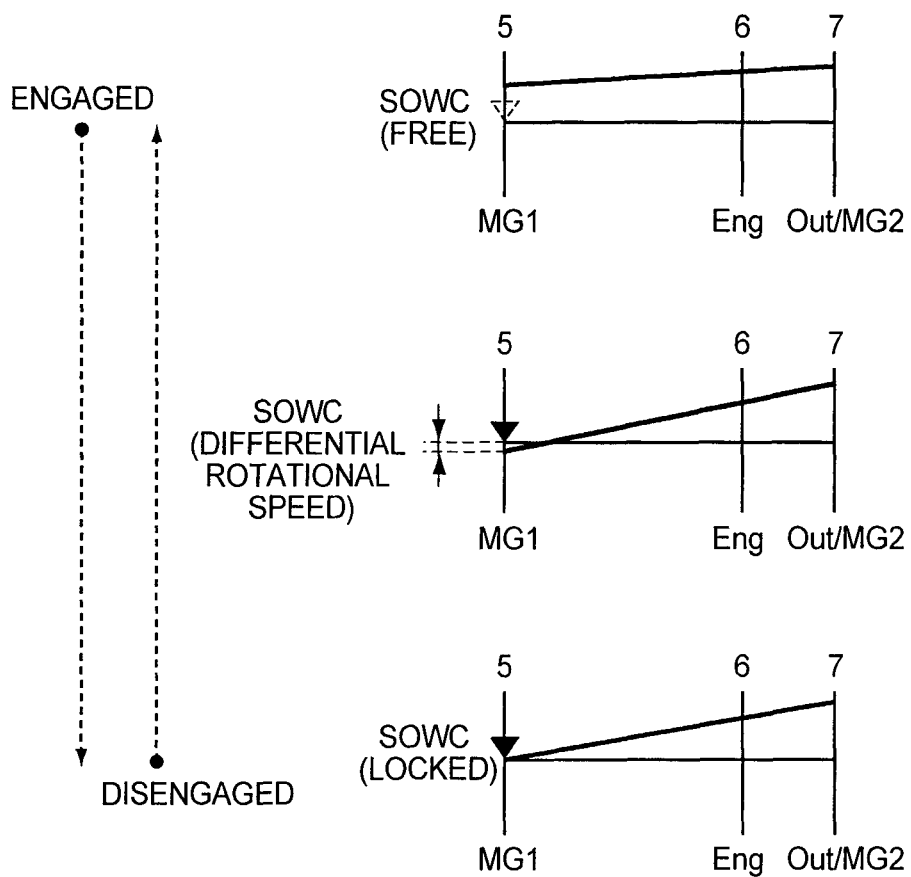

FIG. 2 includes collinear diagrams on a planetary gear mechanism that constitutes the power split mechanism 4. A top diagram in FIG. 2 indicates a forward traveling state in a hybrid mode (an HV mode or a power split mode). Since the engine 1 is driven, the carrier 6 makes the positive rotation. Due to the forward travel, the ring gear 7 makes the positive rotation. At this time, the SOWC 17 is disengaged, and thus the sun gear 5 and the first motor 2, which is connected to the sun gear 5, can rotate in the positive or the reverse direction. In a state shown in the top diagram in FIG. 2, the first motor 2 functions as an electrical power generator while making the positive rotation. In other words, the first motor 2 outputs torque in a negative direction (a downward direction in the top diagram in FIG. 2) and thereby controls the speed of the engine 1 to a speed at which excellent fuel efficiency can be realized. The electrical power generated in the first motor 2 is supplied to the second motor 3. Then, the second motor 3 functions as the motor and outputs drive power for travel.

A third diagram from the top in FIG. 2 indicates a state in which the SOWC 17 stops the positive rotation of the sun gear 5 and the drive power of the engine 1 is used, for the forward travel. In other words, the third diagram from the top in FIG. 2 indicates a forward traveling state (in a so-called parallel mode) in which the drive power of the second motor 3 is added to the drive power of the engine 1 while the SOWC 17 stops the positive rotation of the sun gear 5 and the drive power of the engine 1 is used for the forward travel. In this state, a rotational speed of the ring gear 7 becomes higher than the engine speed (a rotational speed of the carrier 6), and thus the torque is output from the ring gear 7. When the second motor 3 is operated as the motor, the drive power thereof is added to the drive power output from the ring gear 7 and transmitted to the drive wheels 14 via the differential 12. Also in this case, the first motor 2 and the sun gear 5 are fixed, and energization thereof is stopped (in an OFF state). Thus, the excellent fuel efficiency can be realized when the vehicle travels at a high speed.

A second diagram from the top in FIG. 2 indicates a transient state (a transition state) in which the SOWC 17 is switched between the state shown in the top diagram in FIG. 2 and the state shown in the third diagram from the top in FIG. 2. In the second diagram from the top in FIG. 2, the first motor 2 functions as the motor and rotates the sun gear 5 in a reverse rotational direction. Thus, even when the SOWC 17 is controlled to be engaged, torque is not applied to a strut of the SOWC 17, which will be described below.

Figure 3:
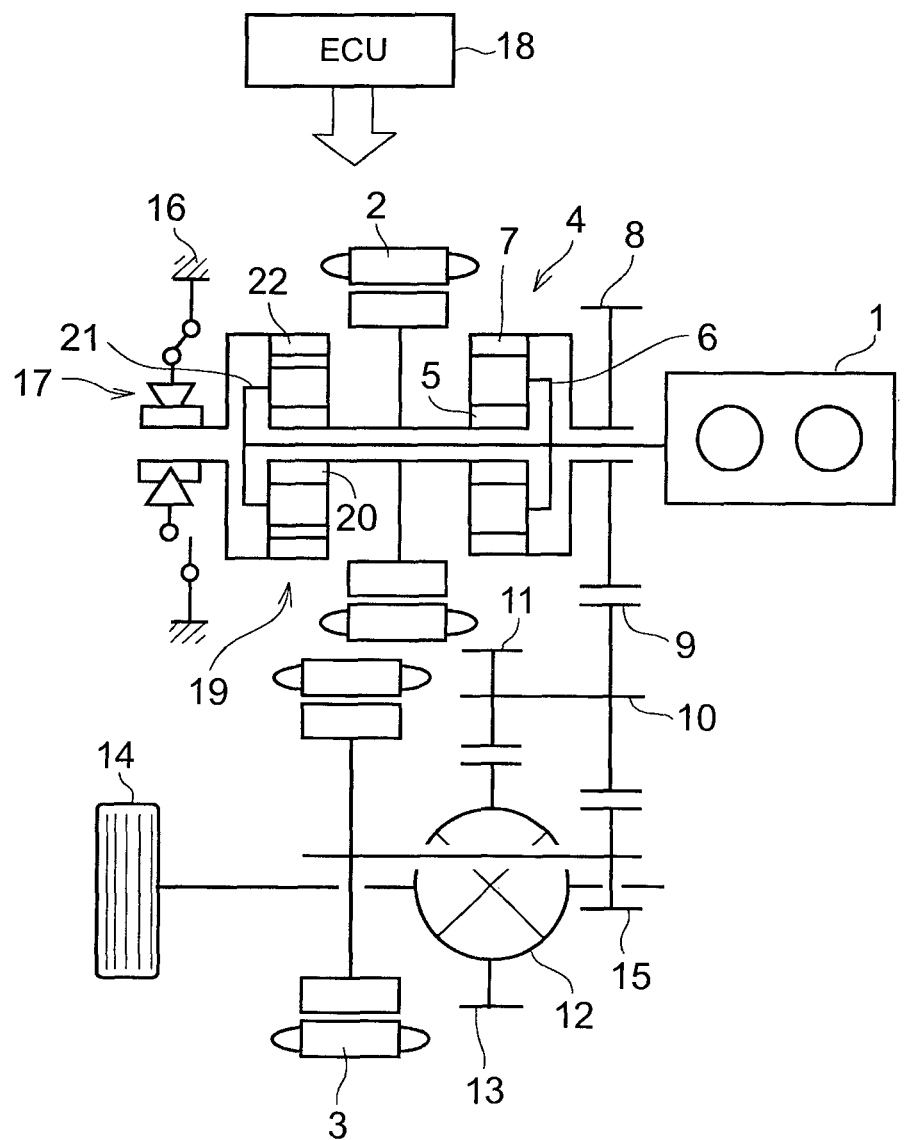
FIG. 3 is a skeleton diagram of another example of the power transmission mechanism that can be the subject of the invention.

FIG. 3 is a schematic diagram of another example of the power transmission mechanism that can be the subject of the invention. The example is configured such that an overdrive (O/D) mechanism 19 is added to the above-described configuration shown in FIG. 1 and the overdrive mechanism 19 is selectively locked by the SOWC 17. The overdrive mechanism 19 is an example of a second differential mechanism of the invention. In the example shown in the drawing, the overdrive mechanism 19 is constructed of a planetary gear mechanism of double pinion type that includes a sun gear 20, a carrier 21, and a ring gear 22 as rotary elements. The carrier 6 in the above-described power split mechanism 4 is coupled to the carrier 21 that is an example of a fourth rotary element of the invention. Accordingly, the output torque of the engine 1 is transmitted to these carriers 6, 21. In addition, the sun gear 5 in the power split mechanism 4 is coupled to the sun gear 20 that is an example of a fifth rotary element of the invention. Accordingly, it is configured that the torque of the first motor 2 is transmitted to these sun gears 5, 20. Furthermore, the above-described SOWC 17 is arranged between the casing 16 and the ring gear 22 that is an example of a sixth rotary element of the invention. It is configured that the SOWC 17 restricts (inhibits) rotation of the ring gear 22 in a specified direction, so as to set an overdrive state. Accordingly, the rotary elements of the planetary gear mechanism of the single pinion type that constitutes the power split mechanism 4 and the rotary elements of the planetary gear mechanism of the double pinion type that constitutes the overdrive mechanism 19 are coupled as described above. Thus, a compound planetary gear mechanism having the four elements is constructed. Since the rest of the configuration of the power transmission mechanism is the same as the configuration shown in FIG. 1, components shown in FIG. 3 are denoted by the same reference numerals as those used in FIG. 1, and the description thereof will not be made.

Figure 4:
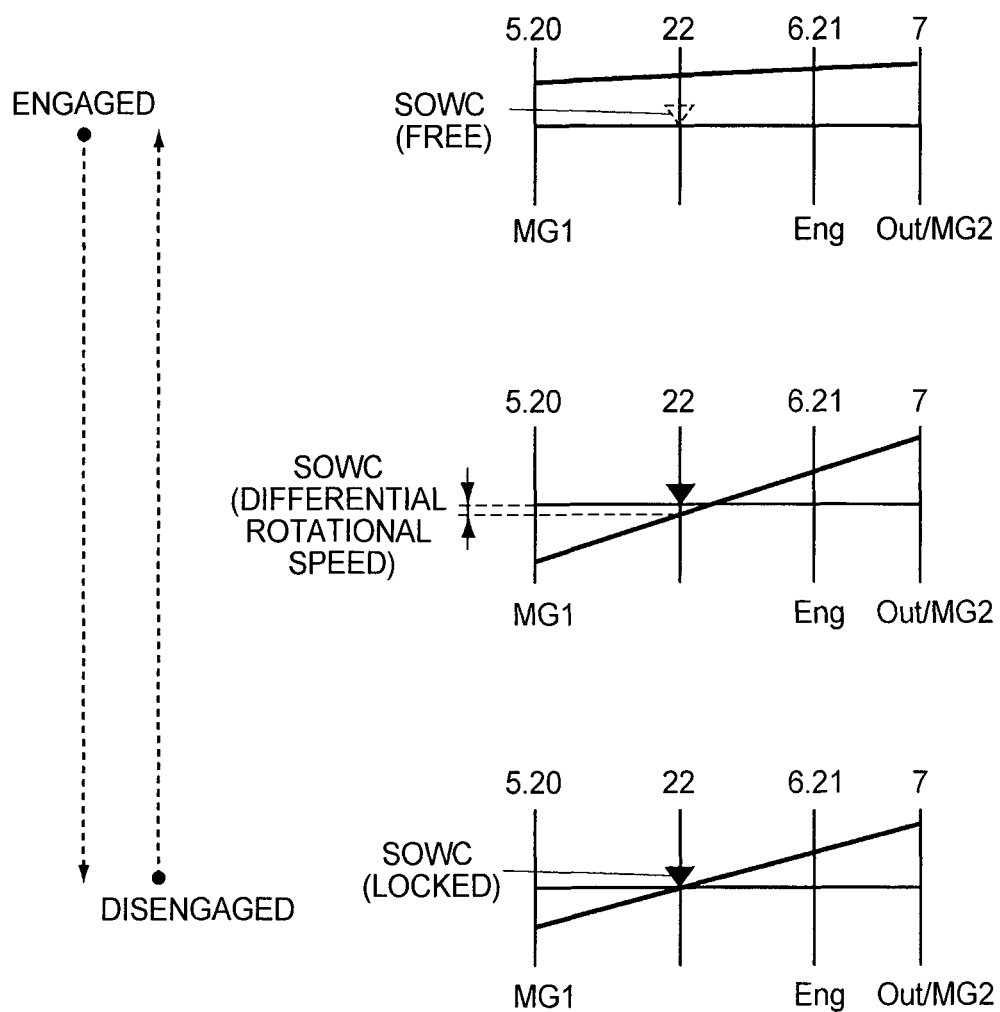
FIG. 4 includes collinear diagrams of a compound planetary gear mechanism/that constitutes the power split mechanism and an overdrive mechanism.

FIG. 4 includes collinear diagrams on the compound planetary gear mechanism. A top diagram in FIG. 4 indicates a forward traveling state in the hybrid mode (the HV mode or the power split mode). Since the engine 1 is driven, the carrier 6 makes the positive rotation. In addition, due to the forward travel, the ring gear 7 makes the positive rotation. At this time, the SOWC 17 is disengaged, and thus the sun gear 5 or the ring gear 22, and the first motor 2, which can rotate the sun gear 5 and the ring gear 22, can rotate in either positive or reverse direction. In the state shown in the top diagram in FIG. 4, the first motor 2 functions as the electrical power generator while making the positive rotation. In other words, the first motor 2 outputs torque in the negative direction (a downward direction in the top diagram in FIG. 4) and thereby controls the speed of the engine 1 to the speed at which the excellent fuel efficiency can be realized. The electrical power generated in the first motor 2 is supplied to the second motor 3. Then, the second motor 3 functions as the motor and outputs the drive power for travel.

A third diagram from the top in FIG. 4 indicates a state in which the SOWC 17 stops the positive rotation of the ring gear 22 and the drive power of the engine 1 is used for the forward travel. In other words, the third diagram from the top in FIG. 4 indicates a forward traveling state in which the drive power of the second motor 3 is added while the SOWC 17 stops the positive rotation of the ring gear 22 and the drive power of the engine 1 is used for the forward travel. In the overdrive mechanism 19, torque in a positive rotational direction is applied to the carrier 21 in a state that the ring gear 22 is fixed so as to prevent rotation thereof in the positive rotational direction. Accordingly, the sun gear 20 makes the reverse rotation. In the power split mechanism 4, the sun gear 5 is integrated with the sun gear 20 in the overdrive mechanism 19 and makes the reverse rotation. Accordingly, in the power split mechanism 4, since the torque of the engine 1 is applied to the carrier 6 in the state that the sun gear 5 makes the reverse rotation, the ring gear 7 as the output element rotates at the higher rotational speed than the carrier 6 (that is, the engine 1). In other words, an overdrive state is produced. Noted that, when the second motor 3 is operated as the motor in this state, the drive power thereof is added to the drive power that is output from the ring gear 7 and is transmitted to the drive wheels 14 via the differential 12. Noted that, in this overdrive state, the torque of the engine 1 can be received by the SOWC 17 instead of the first motor 2, and thus the first motor 2 is controlled in an OFF state. Therefore, the excellent fuel efficiency can be realized when the vehicle travels at the high speed.

A second diagram from the top in FIG. 4 indicates a transient state (a transition state) in which the SOWC 17 is switched between the state shown in the top diagram in FIG. 4 and the state shown in the third diagram from the top in FIG. 4. In the second diagram from the top in FIG. 4, the first motor 2 functions as the motor and rotates the sun gear 5 or the ring gear 22 in the reverse rotational direction. The rotational speed of the first motor 2 when the first motor 2 functions as the motor corresponds to the rotational speed of the ring gear 22 at which the ring gear 22 makes the reverse rotation. Thus, even when the SOWC 17 is controlled to be engaged, the torque is not applied to the strut of the SOWC 17, which will be described below.

Figure 5:
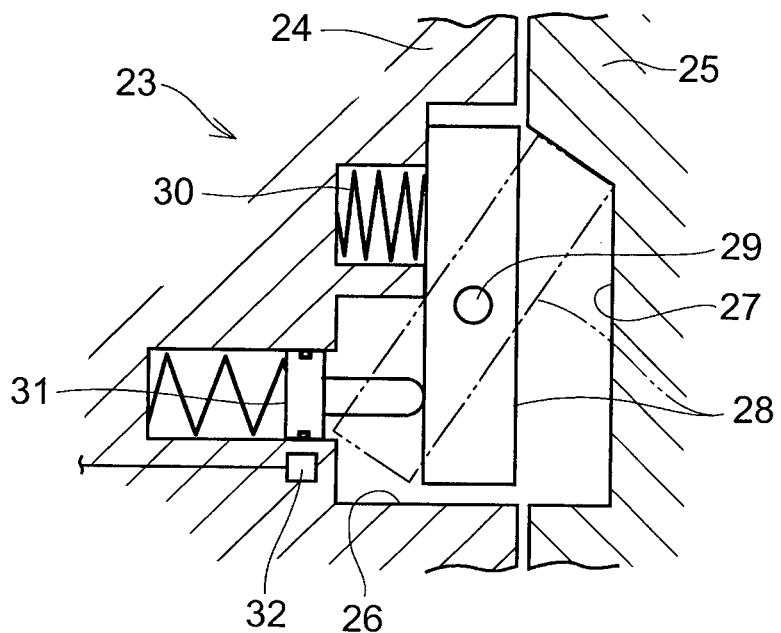
FIG. 5 is a schematic cross-sectional diagram of a configuration of an engagement mechanism in a selectable one-way clutch that can be a subject of the invention.
Figure 6:
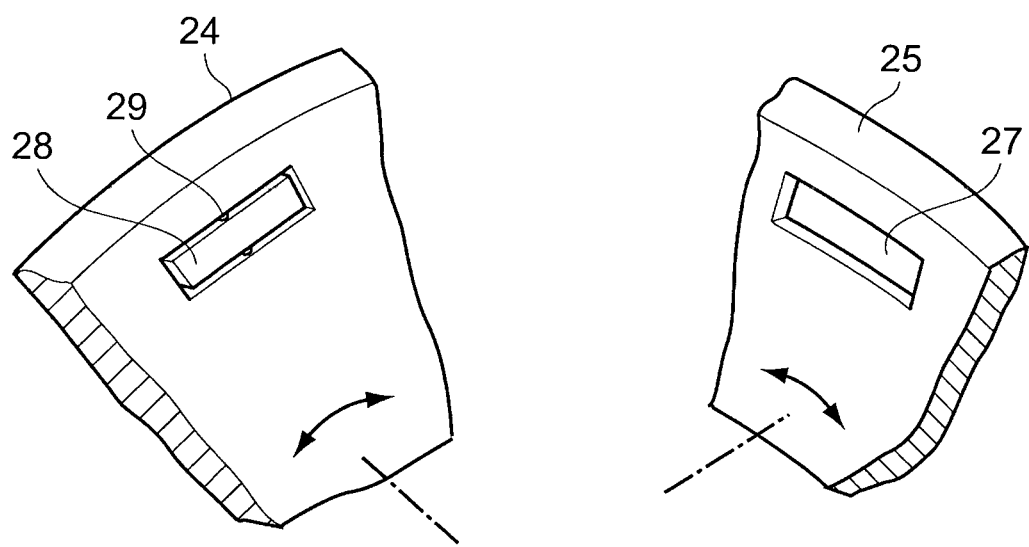
FIG. 6 is a schematic partial diagram of a housing section and a pocket, the housing section being formed in a first clutch plate and the pocket being formed in a second clutch plate of the selectable one-way clutch.

Here, the configuration of the SOWC 17 will be described. For the power transmission mechanism that is the subject of the invention, the SOWC that is described in above-described US 2009/0084653 A, an SOWC that is described in US 2010/0252384 A, or the like can be adopted. Furthermore, the SOWC 17 that is configured as schematically shown in FIG. 5 and FIG. 6 can be adopted. These FIG. 5 and FIG. 6 show an engagement mechanism 23 in the SOWC 17. A first clutch plate 24 is formed in a disc shape as a whole, and a second clutch plate 25 that faces this first clutch plate 24 and has a disc shape is arranged. One of these clutch plates 24, 25 is an example of a first member in the invention, and the other clutch plate is an example of a second member in the invention. These clutch plates 24, 25 are retained to enable relative rotation. For example, the one clutch plate 24 (25) is attached to the above-described casing 16, and the other clutch plate 25 (24) is coupled to the sun gear 5 shown in FIG. 1 or coupled to the ring gear 22 shown in FIG. 3.

The first clutch plate 24 has a recessed section that is elongated in a rotational direction of the first clutch plate 24 at a position that is a front surface of the first clutch plate 24 and shifted to a radially outer side from the center of rotation, that is, at a specified position on an outer peripheral side. This recessed section is a housing section 26. In addition, the second clutch plate 25 has a pocket 27 that is a recessed section in the substantially same shape as the housing section 26 at a radial position that is in a surface of the second clutch plate 25 facing the first clutch plate 24 and corresponds to the position in the housing section 26. A plate-shaped engagement piece (hereinafter referred to as a strut) 28 whose cross section is substantially the same as that of the housing section 26 is housed in the housing section 26. The strut 28 is arranged in the housing section 26 in a manner to swing with a support pin 29 being the center, the support pin 29 being provided at the center in a longitudinal direction of the strut 28 and facing the radial direction of the first clutch plate 24. A depth of the housing section 26 is changed at the support pin 29. An upper half of the housing section 26 in FIG. 5 has a thickness that is substantially equal to a thickness of the strut 28 or that is slightly larger than the thickness of the strut 28. On the contrary, a lower half thereof in FIG. 5 has a thickness that is larger than the thickness of the strut 28. In this way, the strut 28 is configured to be able to swing with the support pin 29 being the center.

A spring 30 that causes an elastic force to act in a direction to push out one end side of the strut 28 from the housing section 26 is arranged in a shallow portion of the housing section 26. In addition, an actuator 31 that presses another end side of the strut 28 in a direction to push out from the housing section 26 is arranged in a deep portion of the housing section 26. This actuator 31 may be able to apply a pressing force to the other end side of the strut 28. A hydraulic actuator such as a hydraulic piston or an electromagnetic actuator such as a solenoid that generates thrust by using an electromagnetic force can be adopted. Accordingly, in a state that the actuator 31 does not press the other end of the strut 28, the one end of the strut 28 is pressed by the spring 30 and is projected from the housing section 26. On the contrary, in a state that the actuator 31 presses the other end of the strut 28, it is configured that the strut 28 rotates about the support pin 29 in a direction to compress the spring 30 and that the entire strut 28 is housed in the housing section 26. Noted that an appropriate elastic member such as a spring may be arranged between the actuator 31 and the one end of the strut 28 in order to relax the pressing force generated by the actuator 31, to allow swinging of the strut 28 in the state that the actuator 31 presses the one end of the strut 28, or the like. In addition, the following description will be made on an example configured that, when the actuator 31 is controlled to be OFF, the actuator 31 presses the other end of the strut 28 to bring the engagement mechanism 23 into a disengaged state. When the actuator 31 is controller to be ON, the actuator 31 cancels pressing of the other end of the strut 28 to bring the engagement mechanism 23 into an engaged state.

As described above, the pocket 27 of the second clutch plate 25 is a portion which the one end of the strut 28 that is projected from the housing section 26 enters and is engaged with. Accordingly, in the engagement mechanism 23, in the case where torque in an upward direction of FIG. 5 acts on the first clutch plate 24 or torque in a downward direction of FIG. 5 acts on the second clutch plate 25 in a state that the one end of the strut 28 is projected (moved) to the second clutch plate 25 side, the strut 28 is meshed between the housing section 26 and the pocket 27 and couples the clutch plates 24, 25 integrally in the rotational direction. That is, the rotation of the first clutch plate 24 in the upward direction of FIG. 5 that is relative to the second clutch plate 25 is restricted. In other words, the rotation of the second clutch plate 25 in the downward direction of FIG. 5 that is relative to the first clutch plate 24 is restricted. This restricted rotational direction corresponds to the positive rotational direction in the power transmission mechanisms shown in above-described FIG. 1 and FIG. 3. Such a state that the positive rotation of the above-described sun gear 5 or ring gear 22 is restricted (or inhibited) corresponds to the engaged state of the engagement mechanism 23 or the SOWC 17. When the torque in the reverse rotational direction (the negative rotational direction) acts on one of the clutch plates 24, 25 in this state, a surface of the strut 28 is pushed by an, edge portion at an opening end of the pocket 27 in the second clutch plate. 25, and the strut 28 acts against the elastic force of the spring 30 and pushed in the housing section 26. In other words, when the torque in the downward direction of FIG. 5 acts on the first clutch plate 24 or the torque in the upward direction of FIG. 5 acts on the second clutch plate 25, the surface of the strut 28 is pushed by the edge portion at the opening end of the pocket 27 in the second clutch plate 25, and the strut 28 acts against the elastic force of the spring 30 and pushed in the housing section 26. In other words, the engagement by the strut 28 is canceled, and the clutch plates 24, 25 can thus make the relative rotation.

Then, when the actuator 31 presses the other end of the strut 28, the strut 28 rotates in such a direction that the one end of the strut 28 enters the housing section 26 while compressing the spring 30, and the strut 28 is housed in the housing section 26. Accordingly, the member that engages the clutch plates 24, 25 no longer exists, and thus the clutch plates 24, 25 can make the relative rotation in either the positive or the negative direction. This state corresponds to the disengaged state of the engagement mechanism 23 or the SOWC 17.

As described above, the engaged state and the disengaged state are switched by the operation of the actuator 31. Accordingly, by detecting the operating state or an operation amount of the actuator 31, it is possible to determine the engaged state or the disengaged state on the basis of the detection result. A stroke sensor 32 for performing such detection is provided. This stroke sensor 32 may be an appropriate sensor that has conventionally been known. For example, the stroke sensor 32 may be a type of sensor that detects a stroke by capacitance or electrical resistance that varies by the operation amount of the actuator 31, a type of sensor that detects the stroke optically, or the like. In addition, instead of detecting the stroke, a so-called ON/OFF sensor may output a signal at an advanced end and a retracted end of the actuator 31.

Figure 7:
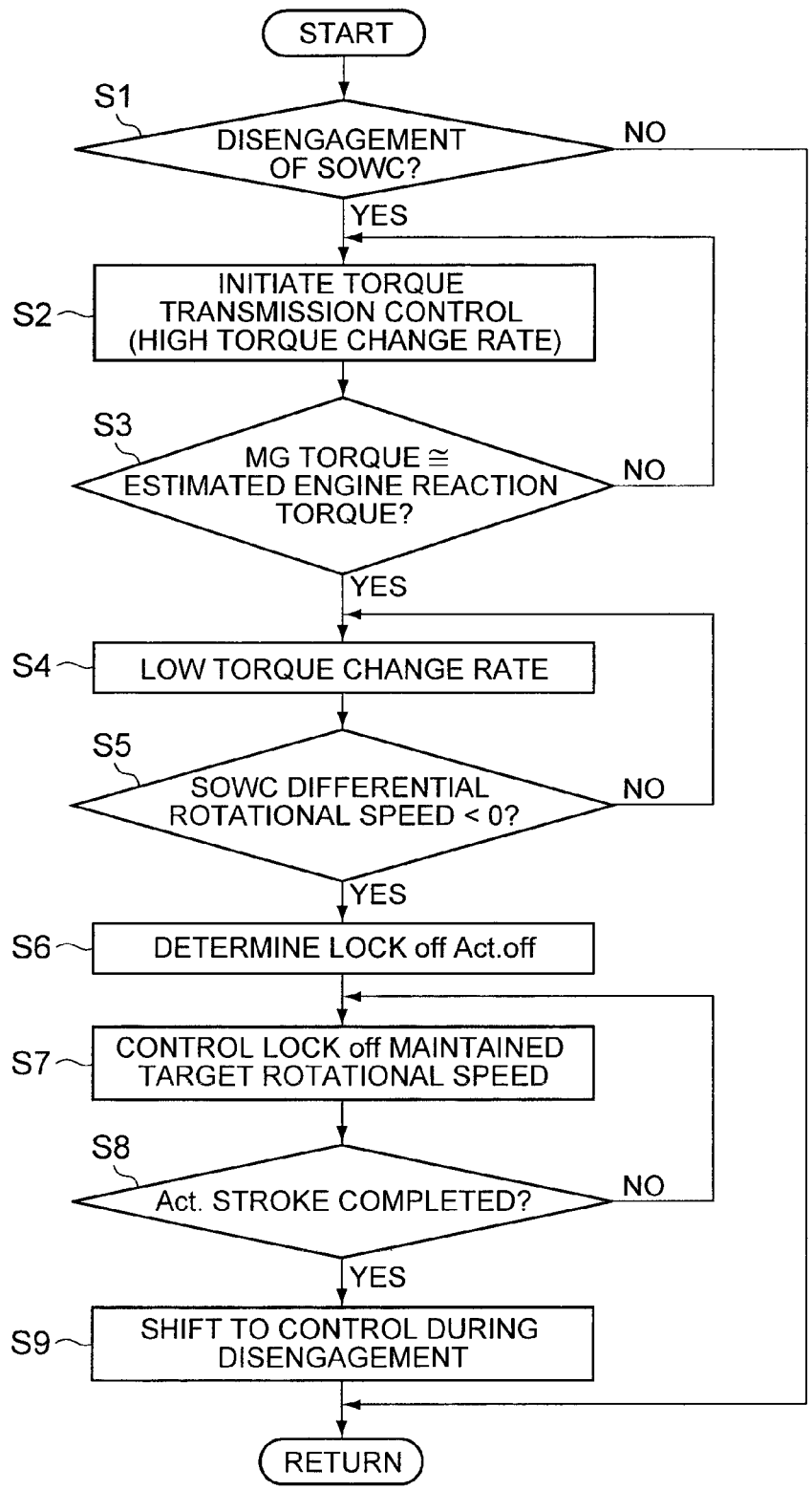
FIG. 7 is a flowchart for illustrating an example of control that is executed by a control device according to the invention.

The above-described SOWC 17 is a so-called dog clutch. Accordingly, in a state that the SOWC 17 is engaged and transmits the torque, the strut 28 is interposed between the housing section 26 of the first clutch plate 24 and the pocket 27 of the second clutch plate 25, and thus the frictional force that inhibits the rotation or swinging of the strut 28 is generated. In view of this, the control device according to an embodiment of the invention that has the above power transmission mechanism as the subject thereof is configured to execute control, which will be described below. FIG. 7 is a flowchart for illustrating an example of such control. A routine shown in the chart is repeatedly executed at specified short time intervals in the case where the vehicle travels in the engaged state of the SOWC 17 or in the case where the engine 1 is operated. In step S1, it is determined whether a determination to disengage the SOWC 17 has been made. In the case where the SOWC 17 is engaged and the positive rotation of the sun gear 5 is stopped, the hybrid vehicle that includes the power transmission mechanism configured as shown in FIG. 1 travels by using the drive power of the engine 1 or the drive power in which the drive power of the second motor 3 is added to the drive power of the engine 1. On the contrary, a drive state in which the SOWC 17 is disengaged corresponds to the HV mode or the power split mode shown in the above-described top diagram in FIG. 2. In this state, a substantial gear ratio becomes higher than that in the parallel mode in which the SOWC 17 is engaged. Acceleration performance or power performance of the vehicle differs in accordance with each of the travel modes, just as described. Thus, each of the travel modes can be predetermined in accordance with a requested drive amount that can be represented by the accelerator operation amount or the vehicle speed. Then, the SOWC 17 is disengaged in the HV mode, but the SOWC 17 is engaged in the parallel mode. Thus, the determination on the disengagement of the SOWC 17 can be substituted by a determination on the travel mode or can be made on the basis of the determination on the travel mode. The same can be applied to the vehicle that includes the power transmission device shown in FIG. 3. Thus, the determination in step S1 can be made on the basis of the requested drive amount, the vehicle speed, a map that is prepared in advance, or the like.

If the travel state that is represented by the requested drive amount, the vehicle speed, and the like is not changed enough to shift the travel mode, a negative determination is made in step S1. In this case, the process returns without executing any particular control. On the contrary, if the requested drive amount is increased such as by depression of an accelerator pedal (not shown), a positive determination is made in step S1. In this case, in order to switch the SOWC 17 or the above-described engagement mechanism 23 to the disengaged state, control for generating negative differential rotation in the one embodiment of the invention (the relative rotation between the first clutch plate 24 and the second clutch plate 25 in the other one of the positive rotation and the reverse rotation) is initiated. In other words, torque transition control is initiated (step S2). This torque transition control is control in which the torque generated (received) by the SOWC 17 is generated (received) by the motor. In the above-described power transmission mechanism shown in FIG. 1 or FIG. 3, the torque transition control is control to gradually increase torque used to rotate the first motor 2 in the reverse rotational direction, and is also control to gradually increase torque that is output by the first motor 2 as the motor after the first motor 2 starts rotating reversely.

An initial change rate of torque at the time that this torque transition control is initiated is set to be higher than a change rate immediately before torque change is stopped. This is because torque is rapidly changed while the rotational speed of the first motor 2 does not change in a process of gradually increasing the torque of the first motor 2. The change rate is set to prevent a rapid change in a speed of a rotational member, such as the engine 1, that is caused by so-called overshoot of the control or generation of shock that is caused by the rapid change. The change rate can be computed in advance by an experiment, a simulation, or the like, for example.

It is determined whether the torque of the first motor 2, which is changed as described above, has become substantially equal to torque that acts on the sun gear 5, or the ring gear 22 and the first motor 2 on the basis of the torque output by the engine 1, that is, reaction torque generated by the first motor 2 (step S3). The torque of the engine 1 can be estimated on the basis of a throttle opening degree or a fuel injection amount when the engine 1 is a gasoline engine or a diesel engine. In addition, as shown in above-described FIG. 2 and FIG. 4, the torque in the positive rotational direction that is based on the engine torque and acts on the sun gear 5 or the ring gear 22 can be computed by a geometric analysis based on a gear ratio of the planetary gear mechanism for constituting the power split mechanism 4 or the overdrive mechanism 19.

A negative determination is made in step S3 if the torque of the first motor 2 does not reach estimated engine reaction torque. In this case, the control in step S2 is continued. On the contrary, a positive determination is made in step S3 if the torque of the first motor 2 reaches the estimated engine reaction torque. In this case, a torque change rate for changing the torque of the first motor 2 is set to be lower than the change rate that is set in above step S2 (step S4). If the torque of the first motor 2 is changed after becoming substantially equal to the estimated engine reaction torque, the speed of the engine 1 starts changing. If the change is rapid, inertia is increased to cause discomfort such as shock. For this reason, in step S4, in order to avoid or suppress such shock or discomfort, the torque change rate of the first motor 2 is set to be low. Accordingly, the torque change rate can be predetermined by an experiment, a simulation, or the like such that the change in the speed of the rotational member, such as the engine 1, and the inertia in conjunction therewith do not cause any shock or discomfort.

In conjunction with the further change in the torque of the first motor 2, the rotational speed of the sun gear 5 or the ring gear 22 in the positive rotational direction is reduced, or the rotational speed thereof in the reverse rotational direction (the negative rotational direction) is gradually increased. Such a change will be described as a change in the SOWC 17. The torque that acts between the clutch plates 24, 25, which hold the strut 28 therebetween and are coupled to each other, (that is, the torque transmitted by the SOWC 17) is gradually reduced to finally become "0". Then, the torque of the first motor 2 is further changed at the small change rate, and thus the clutch plates 24, 25 starts rotating relative to each other. The rotational direction thereof is the direction in which the first clutch plate 24 rotates relative to the second clutch plate 25 in the downward direction in FIG. 5. In other words, the rotational direction thereof is the direction in which the second clutch plate 25 rotates relative to the first clutch plate 24 in the upward direction in FIG. 5. Such relative rotation is an example of the "negative differential rotation" of the invention. A state in which this negative differential rotation is generated corresponds to the state shown in the second collinear diagram from the top in FIG. 2 and the second collinear diagram from the top in FIG. 4, which are described above. Then, it is determined whether this negative differential rotation is generated, that is, a rotational speed of the relative rotation that is generated in the SOWC 17 is lower than "0" (whether the relative rotation in the negative direction is generated) (step S5).

The SOWC 17 that stops the rotation of the above-described sun gear 5 or ring gear 22 is a so-called dog clutch mechanism. However, the SOWC 17 is also a clutch mechanism that allows the so-called reverse rotation (the negative rotation) of the sun gear 5 or the ring gear 22. Accordingly, the SOWC 17 can generate the negative differential rotation. Due to the generation of the negative differential rotation, the torque is not applied to the SOWC 17 or the engagement mechanism 23 (especially, the strut 28) thereof. Thus, if a negative determination is made in step S5, the control in step S4 is continued. On the contrary, if a positive determination is made in step S5, a determination to cancel the restriction on the positive rotation of the sun gear 5 or the ring gear 22 is made (a lock off determination) and the above-described actuator 31 is controlled to be OFF (Act. off) (step S6). Noted that the lock off determination is a determination to initiate or permit control for disengaging the SOWC 17 or the engagement mechanism 23 and is control for turning on a specified control flag, for example. More specifically, from the change rate of the rotational speed of the negative differential rotation at the time and a wasted time period (a delayed time period) until the actuator 31 is actually operated to be off, a change amount of the rotational speed within the wasted time period is computed. A rotation speed that is obtained by subtracting the change amount of the rotational speed from a target value of the negative differential rotation, which will be described below, is set as a threshold. The lock off determination is made when the rotational speed of the negative differential rotation reaches the threshold. In addition, as described above, the OFF control of the actuator 31 is control in which the actuator 31 presses the other end of the strut 28 to the second clutch plate 25 side. Thus, a rotational force that moves the one end of the strut 28 that is, projected to the second clutch plate 25 side to the housing section 26 side acts on the strut 28.

Following the control in step S6 or in parallel with the control in step S6, control is executed to maintain the rotational speed of the negative differential rotation (that is, a lock off rotational speed) to the specified target value (step S7). This control is control to balance between reliable switching of the engagement mechanism 23 to the disengaged state and the other requests made for the vehicle. The target value is determined in advance on the basis of an experiment, a simulation or the like in consideration of any or all of the following conditions: that the engine speed is increased to a speed at which independent rotation of the engine can be continued or higher; that the requested drive power can be obtained; that an NV characteristic is not particularly degraded; that a factor to reduce strength, such as resonance, is not generated; that the fuel efficiency or electrical power consumption rate is not degraded; that there is no bad influence on the hybrid drive system in terms of electrical power balance, heat generation, the rotational speed, or the like; that the above-described rotational speed of the negative differential rotation stays in the negative state even when the rotational speed of the negative differential rotation is shifted to the positive side by disturbance; and the like. In addition, the above target value may be defined in consideration of a case where the speed at which the independent rotation of the engine 1 can be continued can differ by a temperature of the engine 1 (an engine coolant temperature) or an operation state of auxiliary machinery. Furthermore, a time period for which the rotational speed of the negative differential rotation is maintained at the target value corresponds to a time period within which the strut 28 can reliably be removed from the pocket 27 (that is, a time period that is long enough to allow switching from the engaged state to the disengaged state) even when there is a disturbance factor such as fluctuation in the rotational speed due to fluctuation in engine torque, and can be predetermined in design.

Then, it is determined whether the operation amount of the actuator 31 (a stroke amount, for example) has reached an operation amount that allows the engagement mechanism 23 to be completely disengaged, that is, whether the stroke has completed (step S8). This can be determined on the basis of the detection signal output by the above-described stroke sensor 32. If a negative determination is made in this step S8, the engagement mechanism 23 is not switched to the disengaged state. Thus, the control in step S7 is continued. On the contrary, if a positive determination is made in step S8, the control of the power transmission mechanism is shifted to control that is executed in the disengaged state of the SOWC 17 (step S9). For example, the mode is switched to the HV mode, and the control of the engine 1 and the motors 2, 3 is executed. Then, the rotational speed of the sun gear 5 or the ring gear 22 and the rotational speed of the first motor 2 are controlled to target rotational speeds that can be computed on the basis of the vehicle speed or the accelerator operation amount at the time, the above-described gear ratio of the each planetary gear mechanism, or the like.

Examples of changes in the rotational speed of the negative differential rotation and the torque of the first motor 2 (MG torque) are shown in FIG. 8A and FIG. 8B when the above-described control shown in FIG. 7 is executed. If the determination is made to switch the SOWC 17 to the disengaged state while the vehicle travels with the SOWC 17 being engaged (time t1), the above-described torque transition control is initiated, and the torque of the first motor 2 is changed at the high change rate as described above (time t2). Once the torque of the first motor 2 becomes substantially equal to the estimated engine reaction torque, the torque change rate of the first motor 2 is changed to a low change rate (time t3). Noted that a specified torque range with the estimated engine reaction torque being the center is predetermined and this time t3 can be set as time at which the torque of the first motor 2 falls in the torque range.

When the torque of the first motor 2 exceeds the estimated engine reaction torque, the first motor 2 and either one of the sun gear 5 or the ring gear 22 start gradually rotating in the reverse rotational direction (the negative rotational direction). In the SOWC 17, the clutch plates 24, 25 start rotating relative to each other in a direction to cancel the coupling therebetween via the strut 28. Then, when the rotational speed of the SOWC 17 reaches the threshold for the above-described lock off determination (time t4), the actuator 31 is controlled to disengage the engagement mechanism 23, that is, the SOWC 17. Thereafter, when the rotational speed of the negative differential rotation reaches the above-described target value (the lock off maintenance target rotational speed), the target value is maintained.

The actuator 31 keeps being operated in this state. Accordingly, the engagement mechanism 23 is gradually switched to the disengaged state. As a result, if it is determined on the basis of the detection signal of the stroke sensor 32 that the operation (stroke) of the actuator 31 is completed (time t5), the control of the power transmission mechanism is shifted to control that is executed in the disengaged state of the SOWC (time t6). In other words, the control in the HV mode is initiated. More specifically, the first motor 2 and either one of the sun gear 5 or the ring gear 22 rotate positively, and the first motor 2 functions as the electrical power generator and generates the negative torque.

As it has been described specifically so far, according to the control device of the invention, the negative differential rotation in the direction to cancel interposition or meshing of the strut 28 is generated between the first clutch plate 24 and the second clutch plate 25 that constitute the SOWC 17, and thus the engagement mechanism 23 is switched to the disengaged state. In other words, a state that the strut 28 does not mesh between the clutch plates 24, 25 or a state that a load for inhibiting the rotation or swinging of the strut 28 does not act thereon is actively formed, so as to disengage the engagement mechanism 23. Accordingly, even when the fluctuation in the engine torque or the like or the fluctuation of the speed caused thereby occurs, the engagement mechanism 23 can reliably and rapidly be switched to the disengaged state.

Noted that the invention may be configured such that, as described above, the so-called negative differential rotation is generated in the SOWC 17, so as to switch the engagement mechanism 23 to the disengaged state. Thus, in the invention, the actuator 31 may be operated to switch the SOWC 17 to the disengaged state, and the above-described torque transition control (the torque control for generating the negative differential rotation) may be executed in this state. FIG. 9 is a flowchart for illustrating an example of such control. The control example illustrated in the drawing is configured that, of the control example illustrated in above-described FIG. 7, the operation of the actuator 31 for switching the SOWC 17 to the disengaged state, that is, the control to turn off the actuator 31 (Act. off) is executed prior to the torque transition control.

More specifically, as shown in FIG. 9, when a determination is made to disengage the SOWC 17 (step S1) is made, the actuator 31 is switched to an off state (step S11), and following this, the torque transition control is initiated (step S2). The control in this step S2 is as described as above and is continued until the torque of the first motor 2 becomes substantially equal to the reaction force that is based on the estimated engine torque (until the positive determination is made in step S3). Then, after the positive determination is made in step S3, the negative differential rotation starts being generated in the SOWC 17, and the control is executed to maintain the rotational speed at the above-described target value (step S7). This control is as described above with reference to FIG. 7. With such control, the above-described load to interpose the strut 28 in the engagement mechanism 23 (or the meshing load) no longer acts thereon. Accordingly, the strut 28 rotates in a manner to be housed in the housing section 26 of the first clutch plate 24, and the SOWC 17 is switched to the disengaged state. Then, when the stroke sensor 32 detects that the operation (the stroke) of the actuator (Act) is completely terminated (a positive determination is made in step S8); a determination that the SOWC 17 has been switched to the disengaged state is made, and control is shifted to control that is executed after the SOWC 17 is disengaged (step S9).

With such control, even when the pressing force generated by the actuator 31 acts on the above-described strut 28, the friction force that is caused by the interposition of the strut 28 between the clutch plates 24, 25 acts on the strut 28. Thus, the strut. 28 is not operated immediately in a manner to be switched to the disengaged state. Then, the negative differential rotation is generated thereafter, and thus the friction force that acts on the strut 28 is reduced or canceled. Accordingly, the strut 28 is rotated or swung by the pressing force generated by the actuator 31 and housed in the above-described housing section 26, and the SOWC 17 is switched to the disengaged state. Therefore, according to the control device of the invention, the SOWC 17 can reliably and rapidly be switched to the disengaged state.

Figure 10:
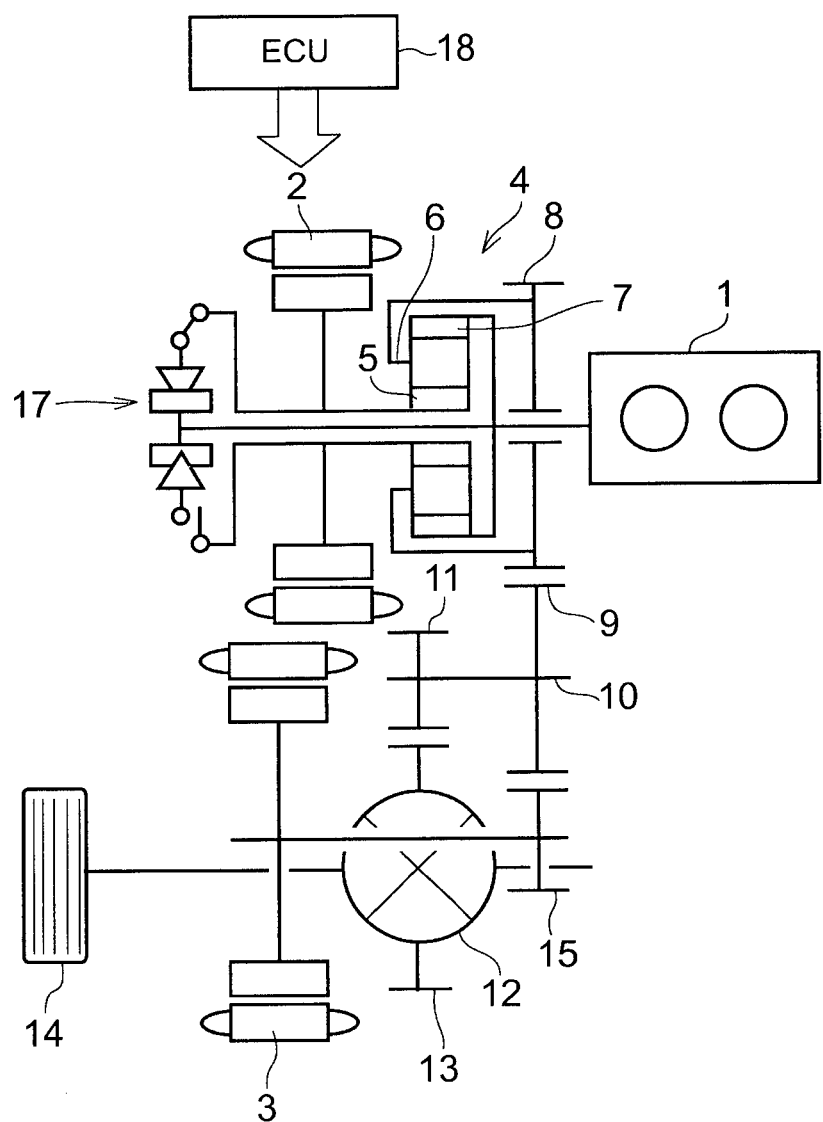
FIG. 10 is a skeleton diagram of a further example of the power transmission mechanism that can be the subject of the invention.

In the above-described specified example, the SOWC 17 is used as a brake to selectively stop the rotation of the sun gear 5 or the ring gear 22. In the invention, the SOWC 17 can be configured to be used as a clutch for selectively transmitting torque between the two rotational members. Such an example is schematically shown in FIG. 10. In the example shown in the drawing, the configuration shown in the above-described FIG. 1 is partially changed. Instead of the engine 1, the output gear 8 is coupled to the carrier 6 in the planetary gear mechanism that constitutes the power split mechanism 4. In addition, instead of the output gear 8, the engine 1 is coupled to the ring gear 7. Furthermore, the SOWC 17 is configured such that the ring gear 7 (the engine 1) and the sun gear 5 are selectively coupled thereto. The engagement direction of the SOWC 17 is a direction in which the torque is transmitted from the engine 1 to the sun gear 5 in the positive rotational direction. The rest of the configuration is the same as the configuration shown in FIG. 1. Thus, the components in FIG. 10 are denoted by the same reference numerals as those in FIG. 1, and the description thereof will not be made.

In the power transmission mechanism that is configured as shown in FIG. 10, the HV mode (or the power split mode) and a direct connection mode (or the parallel mode) can be set. In the HV mode, the power output by the engine 1 is divided by the output gear 8 and the first motor 2. In the direct connection mode, a differential action of the power split mechanism 4 is stopped, and the entire power split mechanism 4 is integrated for rotation. The SOWC 17 is engaged when the vehicle travels forward in the direct connection mode.

Figure 11:
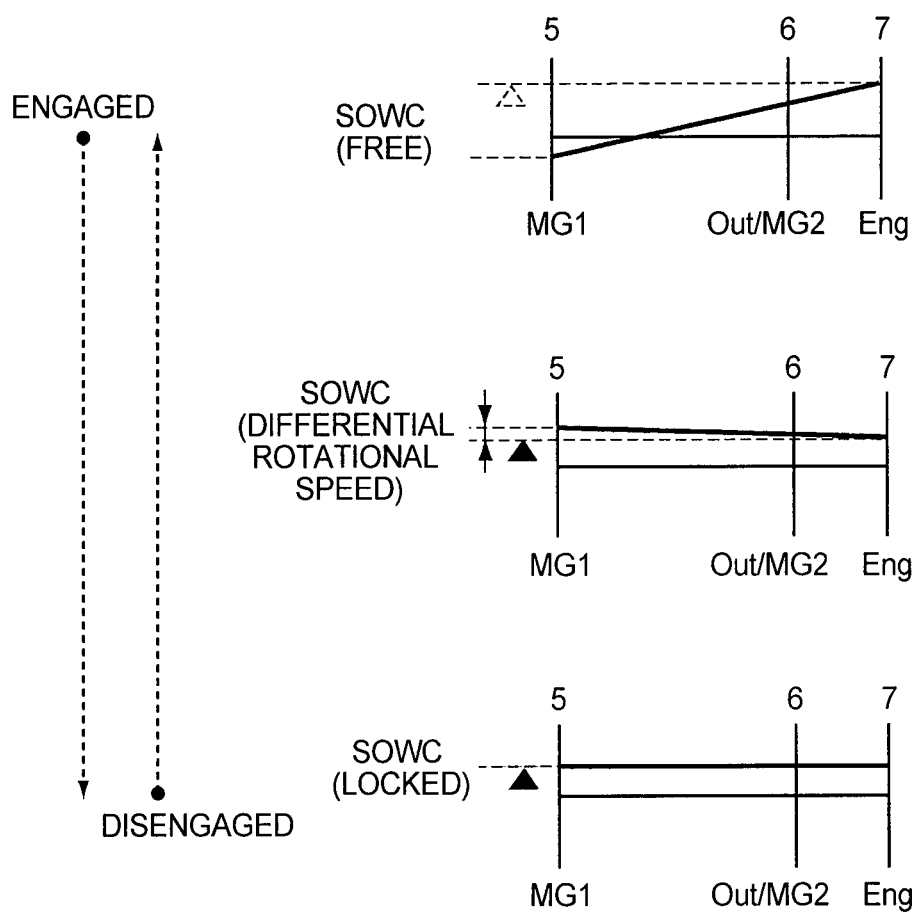
FIG. 11 includes collinear diagrams on the planetary gear mechanism that constitutes the power split mechanism.

FIG. 11 includes collinear diagrams on the planetary gear mechanism that constitutes the power split mechanism 4 shown in FIG. 10, and a top diagram in FIG. 11 shows a state that the vehicle travels forward in the HV mode in which the SOWC 17 is disengaged. The torque of the engine 1 in the positive rotational direction is transmitted to the ring gear 7. Meanwhile, the reaction torque in the reverse rotational direction that is generated in conjunction with the travel of the vehicle acts on the carrier 6. Accordingly, the torque in the reverse rotational direction acts on the sun gear 5. This torque in the reverse rotational direction corresponds to the torque that is generated when the engine 1 rotates positively with respect to the sun gear 5. However, due to the disengagement of the SOWC 17, the sun gear 5 rotates reversely as shown in the top diagram in FIG. 11, for example. The first motor 2 that is coupled to this sun gear 5 functions as the electrical power generator and applies the torque in the positive rotational direction (the upward direction in the top diagram in FIG. 11) as the reaction force to the sun gear 5. As a result, the torque of the engine 1 is amplified and transmitted to the output gear 8, which is coupled to the carrier 6. In addition, the first motor 2 controls the speed of the engine 1 to a speed at which the excellent fuel efficiency can be realized. Furthermore, the electrical power generated by the first motor 2 is supplied to the second motor 3, and then the second motor 3 functions as the motor. The second motor 3 converts some of the power of the engine 1 that has been converted to the electrical power to the mechanical power again, and transmits the mechanical power to the drive wheels 14.

A third diagram from the top in FIG. 11 indicates a state that the vehicle travels forward in the direct connection mode. In a forward travel state, as described above, the torque in the direction to cause the reverse rotation of the sun gear 5 acts thereon, and the engine 1 attempts to make the positive rotation relative to the sun gear 5. Accordingly, when the SOWC 17 is controlled in the engaged state, the above-described strut 28 is interposed (meshed) between the housing section 26 of the first clutch plate 24 and the pocket 27 of the second clutch plate 25, and thus the sun gear 5 and the engine 1 are coupled to make integral rotation in the positive rotational direction. As a result, since the two rotary elements are integrated, the entire power split mechanism 4 rotates integrally, and the engine 1 is directly connected to the output gear 8.

When the SOWC 17 is switched from the engaged state to the disengaged state, the torque generated in the SOWC 17 is generated by the first motor 2, and the first motor 2 causes the sun gear 5 to rotate relative to the engine 1 in the positive rotational direction. In other words, the first motor 2 is controlled such that the engine 1 makes the reverse rotation (the negative rotation) relative to the sun gear 5. Such relative rotation is an example of the negative differential rotation of the invention. This state is shown in a second diagram from the top in FIG. 11. Thus, the direction of the negative differential direction, the direction of the torque of the first motor 2, and the rotational direction of the first motor 2 are opposite of those in the example shown in above-described FIG. 8A and FIG. 8B. However, the same control as the control example shown in FIG. 7 is executed to enable reliable and rapid disengagement of the SOWC 17.

Noted that the invention can be applied to a control device for a power transmission mechanism that includes a stepped transmission or a continuously variable transmission other, than each of the above-described power transmission mechanisms of hybrid type. Thus, the motor in the invention may be a motor for controlling the SOWC only.

The invention claimed is:

1. A control system for a vehicle, the control system comprising:
a selectable one-way clutch including an engagement mechanism, the engagement mechanism including a first member and a second member, the second member being configured to rotate relative to the first member, the engagement mechanism being configured to be switched between an engaged state and a disengaged state, the engaged state being a state in which relative rotation between the first member and the second member in one of a positive rotational direction and a reverse rotational direction is restricted, and the disengaged state being a state in which (i) the relative rotation between the first member and the second member in the one of a positive rotational direction and a reverse rotational direction and (ii) relative rotation between the first member and the second member in the other one of the positive rotational direction and the reverse rotational direction are permitted;

a motor configured to rotate one of the first member and the second member; and an electronic control unit configured to apply torque to the one of the first member and the second member by using the motor such that the relative rotation in the other one of the positive rotational direction and the reverse rotational direction is generated between the first member and the second member when the engagement mechanism is switched from the engaged state to the disengaged state, the electronic control unit being configured to maintain a difference in rotational speed between the first member and the second member at a target value in a state that the relative rotation in the other one of the positive rotational direction and the reverse rotational direction is generated, an internal combustion engine, the other one of the first member and the second member being configured such that torque of the internal combustion engine acts on the other one of the first member and the second member, and the target value being a value at which an absolute value of the rotational speed of the relative rotation in the other one of the positive rotational direction and the reverse rotational direction is maintained to be larger than "0" even when the torque of the internal combustion engine fluctuates in a process of switching the engagement mechanism from the engaged state to the disengaged state.

2. The control system according to claim 1, wherein the electronic control unit is configured to switch the engagement mechanism from the engaged state to the disengaged state in a state that the relative rotation in the other one of the positive rotational direction and the reverse rotational direction is generated.

3. The control system according to claim 1, wherein the electronic control unit is configured to continue maintaining the difference in rotational speed at the target value until the engagement mechanism is switched from the engaged state to the disengaged state.

4. The control system according to claim 1, wherein the electronic control unit is configured to switch the engagement mechanism to the disengaged state when a rotational speed of the relative rotation in the other one of the positive rotational direction and the reverse rotational direction reaches a predetermined reference rotational speed.

5. The control system according to claim 1, wherein the engagement mechanism includes an engagement piece, an actuator, and a sensor, the engagement piece is supported by one of the first member and the second member, the other one of the first member and the second member has a recessed section, the recessed section is configured to fit a tip of the engagement piece and the recessed section is engaged with the engagement piece, the actuator is configured to operate the engagement piece to an engaged position and a disengaged position, the engaged position is a position at which the tip of the engagement piece is moved toward the other one of the first member and the second member by the actuator and the tip of the engagement piece is engaged with the recessed section, the disengaged position is a position at which the tip of the engagement piece is separated from the recessed section by the actuator, the sensor is configured to detect an operation amount of the actuator, and the electronic control unit is configured to determine that the engagement mechanism is switched to the disengaged state based on the operation amount of the actuator that is detected by the sensor.

6. The control system according to claim 1, further comprising:

an output member; and a power transmission mechanism including a fixed section and a first differential mechanism, wherein the fixed section is coupled to the other one of the first member and the second member, the fixed section is configured not to rotate and move, the first differential mechanism includes a first rotary element, a second rotary element, and a third rotary element, each of which performs a differential action with respect to each other, the internal combustion engine is coupled to the first rotary element, the motor and the other one of the first member and the second member are coupled to the second rotary element, and the first differential mechanism is configured such that torque is output from the third rotary element to the output member, and the first differential mechanism is configured such that a speed of the internal combustion engine is reduced by reducing a rotational speed of the second rotary element that is in the same direction as a rotational direction of the internal combustion engine or by increasing a rotational speed of the second rotary element that is in an opposite direction from the rotational direction of the internal combustion engine.

7. The control system according to claim 6, wherein the rotational speed of the relative rotation in the other one of the positive rotational direction and the reverse rotational direction corresponds to a rotational speed of the motor that rotates the second rotary element in the opposite direction, and the rotational speed of the relative rotation in the other one of the positive rotational direction and the reverse rotational direction corresponds to a rotational speed that is at least equal to a minimum rotational speed at which the internal combustion engine rotates independently.

8. The control system according to claim 1, further comprising:

an output member; and a power transmission mechanism including a fixed section, a first differential mechanism, and a second differential mechanism, wherein the fixed section is coupled to the other one of the first member and the second member, the fixed section is configured not to rotate and move, the first differential mechanism includes a first rotary element, a second rotary element, and a third rotary element, each of which performs a differential action with respect to each other, the internal combustion engine is coupled to the first rotary element, the motor is coupled to the second rotary element, and the first differential mechanism is configured such that torque is output from the third rotary element to the output member, the second differential mechanism includes a fourth rotary element, a fifth rotary element, and a sixth rotary element, each of which performs a differential action with respect to each other, the first rotary element is coupled to the fourth rotary element, the second rotary element is coupled to the fifth rotary element, the one of the first member and the second member is coupled to the sixth rotary element, the fifth rotary element is configured to rotate in an opposite direction from a rotational direction of the fourth rotary element when the rotation of the sixth rotary element stops, and the first differential mechanism and the second differential mechanism are configured such that a speed of the internal combustion engine is reduced by reducing a rotational speed of the second rotary element that is in the same direction as a rotational direction of the internal combustion engine or by increasing a rotational speed of the second rotary element that is in the opposite direction from the rotational direction of the internal combustion engine.

9. The control system according to claim 8, wherein the rotational speed of the relative rotation in the other one of the positive rotational direction and the reverse rotational direction corresponds to a rotational speed of the sixth rotary element, and the rotational speed of the relative rotation in the other one of the positive rotational direction and the reverse rotational direction corresponds to a rotational speed that is at least equal to a minimum rotational speed at which the internal combustion engine rotates independently.

10. The control system according to claim 1, wherein the electronic control unit is configured to switch the engagement mechanism from the engaged state to the disengaged state by generating the relative rotation in the other one of the positive rotational direction and the reverse rotational direction in a state that control to switch the engagement mechanism from the engaged state to the disengaged state is executed.

\* \* \* \* \*